(12) United States Patent
Marx et al.

(10) Patent No.: US 6,969,491 B1
(45) Date of Patent: Nov. 29, 2005

(54) STIRRED TUBE REACTOR AND METHOD OF USING THE SAME

(75) Inventors: Ryan E. Marx, Cottage Grove, MN (US); James M. Nelson, Roseville, MN (US); Kenneth J. Hanley, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/931,732

(22) Filed: Sep. 1, 2004

(51) Int. Cl.[7] ............................................. B01J 10/00
(52) U.S. Cl. ..................................... 422/129; 422/132
(58) Field of Search ................................ 422/132, 129

(56) References Cited

U.S. PATENT DOCUMENTS

| | | |
|---|---|---|
| 3,248,179 A | 4/1966 | Norwood |
| 3,438,952 A | 4/1969 | Christensen |
| 3,630,688 A | 12/1971 | Takiguchi et al. |
| 3,681,308 A | 8/1972 | Irvin et al. |
| 3,752,653 A | 8/1973 | Weber |
| 4,277,585 A | 7/1981 | Fournel et al. |
| 4,321,344 A | 3/1982 | Sumitani et al. |
| 4,438,074 A | 3/1984 | Wilt |
| 4,442,273 A | 4/1984 | Neiditch et al. |
| 4,460,278 A | 7/1984 | Matsubara et al. |
| 4,921,906 A | 5/1990 | Meyer et al. |
| 5,145,255 A | 9/1992 | Shimada et al. |
| 5,397,179 A | 3/1995 | Berlin et al. |
| 5,472,278 A | 12/1995 | Kawaoka et al. |
| 5,599,507 A | 2/1997 | Shaw et al. |
| 5,650,536 A | 7/1997 | Dankworth et al. |
| 6,153,149 A * | 11/2000 | Rabitz et al. ............... 422/108 |
| 6,197,264 B1 | 3/2001 | Korhonen et al. |
| 6,252,018 B1 | 6/2001 | Rupaner et al. |
| 6,319,996 B1 | 11/2001 | Burke et al. |
| 6,429,268 B1 | 8/2002 | Xiongwei |
| 6,448,353 B1 | 9/2002 | Nelson et al. |
| 6,492,471 B1 | 12/2002 | Eisenbeiss et al. |
| 6,673,878 B2 | 1/2004 | Donck |
| 6,677,408 B1 | 1/2004 | Mahling et al. |
| 6,716,935 B1 | 4/2004 | Nelson et al. |
| 2004/0023016 A1 | 2/2004 | Cernohous et al. |
| 2004/0024130 A1 | 2/2004 | Nelson et al. |

OTHER PUBLICATIONS

Hsieh et al., "Anonionic Polymerization:Principles and Practical Applications", Ch. 5 and 23, Marcel Dekker Inc, New York, 1996.

Luxton et al., "Star-branched polymers: 2. Linking reaction involving 2- and 4- vinyl pyridine and dienyl and styryl-lithium chain ends", Polymer, Nov. 1978, vol. 19, pp. 1320-1324.

Klein et al., "Synthesis and characterization of block copolymers containing poly (tert.butyl acrylate) blocks", Polymer, 1991, vol. 32, No. 12, pp. 2278-2282.

Marx et al., "Device for the Continuous Process for the Production of Controlled Architecture Materials", U.S. Appl. No. 10/606,916, filed Jun. 16, 2003.

* cited by examiner

Primary Examiner—William K. Cheung (57) ABSTRACT

A stirred tube reactor has a plurality of collinear stirring shafts that may rotate independently.

15 Claims, 2 Drawing Sheets

STIRRED TUBE REACTOR AND METHOD OF USING THE SAME

BACKGROUND

There are a number of well-known processes for producing polymers. Examples include emulsion polymerization, suspension polymerization, solution polymerization and bulk polymerization. Each of these may be carried out by either continuous or batch polymerization methods. Continuous polymerization methods, particularly continuous bulk polymerization methods, typically provide resource and energy savings over corresponding batch polymerization methods.

A plug flow reactor is one type of vessel in which to carry out continuous bulk or continuous solution polymerization. In a plug flow reactor, the reactants flow from an input end of a reactor to an output end (sometimes referred to in the art as an "extraction end"). In a plug flow reactor, the residence time distribution of reactants is generally minimized, resulting in what is often termed "plug flow" or "piston flow". In an ideal plug flow reactor any cross sectional sample taken perpendicular to the flow of reactants has a uniform residence time in the reactor. Of course, in the real world, some variation from this ideal is permitted in reactors that are still considered "plug flow" reactors.

One type of plug flow reactor is a "stirred tube reactor" (also known in the art as a "stirred tubular reactor"). Most stirred tube reactors have a shaft stirrer disposed within a reaction chamber.

Continuous polymerization carried out in a stirred tube reactor may have a number of drawbacks. For instance, the formation of stagnant fluid pockets (i.e., those portions of the reacting fluid that remain motionless) tends to occur in certain regions of the reaction vessel. These stagnant pockets can lead to non-uniform residence time and a broadening of residence time distribution. Furthermore, high viscosity polymers may tend to adhere to the surfaces inside the reaction chamber, leading to reactor fouling.

SUMMARY

In one aspect, the present invention relates to a stirred tube reactor comprising a reaction chamber, a feed port in fluid communication with the chamber, an extraction port in fluid communication with the chamber, a first shaft having first and second ends, wherein the first end of the first shaft extends into the chamber and the first shaft has at least one mixing member extending therefrom, a second shaft having first and second ends, wherein the first end of the second shaft extends into the chamber, and the second shaft is substantially collinear with the first shaft, and the second shaft has at least one mixing member extending therefrom, a first driving mechanism that rotationally engages the first shaft, and a second driving mechanism that rotationally engages the second shaft.

In another aspect, the present invention relates to a method of continuous polymerization comprising introducing a reaction mixture comprising a polymerizable monomer, an initiator, and solvent into the feed port of a stirred tube reactor according to the present invention, polymerizing the monomer, and radially mixing the reaction mixture as the reaction mixture axially travels in an essentially plug flow manner through the cylindrical chamber to give a polymerized material.

In yet a further aspect, the present invention provides a reactor comprising a reaction chamber, means for providing plug flow, and means for providing differential stirring in at least two axially distinct segments of the reaction chamber.

Some embodiments of the present invention are useful, for example, for preparing polymeric materials having a narrow polydispersity in a continuous polymerization process, for reducing reactor fouling during a continuous polymerization process, or both.

The above summary of the present invention is not intended to describe each disclosed embodiment or every implementation of the present invention. The Figures and the Detailed Description that follow, more particularly exemplify illustrative embodiments.

DETAILED DESCRIPTION

Stirred tube reactors according to the present invention have two or more segments capable of being stirred at different rates, in different directions, or both. One exemplary embodiment of a stirred tube reactor according to the present invention is shown in FIG. 1.

Figure 1:
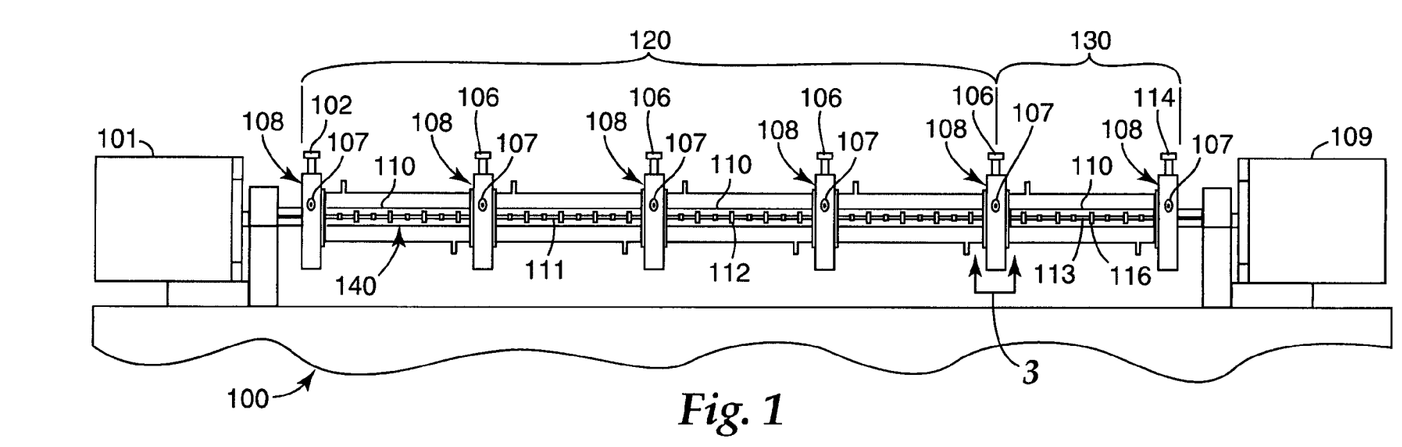
FIG. 1 is a side view of an exemplary embodiment of the present invention.
Figure 3:
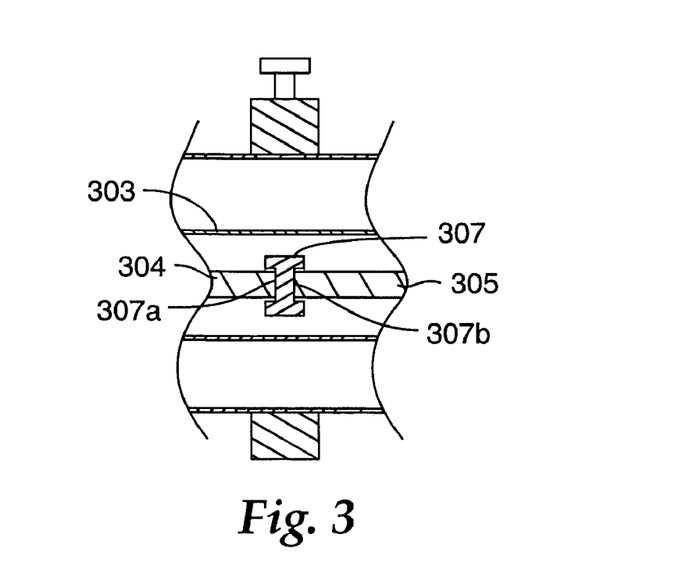
FIG. 3 is an enlarged cross-sectional view of the shaft coupling area of FIG. 1.

Referring now to FIG. 1, and as shown in more detail in FIG. 3, stirred tube reactor 100 has a series of cylinders 110 joined together to form substantially cylindrical reaction chamber 140. First and second shafts 111, 113 are disposed in reaction chamber 140 of stirred tube reactor 100. First and second shafts 111, 113 each extend into reaction chamber 140, and terminate proximal to one another (for instance, see shafts 304 and 305 as shown in FIG. 3). As shown in FIG. 1, first shaft 111 extends the entire length of first stirring section 120 and second shaft 113 extends the entire length of second stirring section 130. First and second shafts 111, 113 each outwardly extends from reaction chamber 140 and rotationally engage first and second driving mechanisms 101, 109, respectively.

First and second shafts 111, 113 each have a plurality of paddles 112, 116, respectively, radially extending therefrom. First and second shafts 111, 113 rotationally engage respective driving mechanisms 101, 109, which are capable of rotating shafts 111, 113. By having two separate driving mechanisms 101, 109, and two shafts 111, 113, the embodiment of the present invention shown in FIG. 1 enables stirring in first stirring region 120 to differ from the stirring in second stirring region 130. This may be advantageous where, for instance, the viscosity of a reaction mixture in first stirring region 120 is much lower than the viscosity in second stirring region 130.

In another embodiment, the first and second shaft may also be completely contained within the reaction chamber, so long as the first and second shafts are in rotational engagement with the first and second driving mechanisms, respectively.

The reaction chamber may have a volume ranging from a fraction of a liter to several hundred liters or more. When made of cylinders, as in FIG. 1, the cylinders may comprise, for example, glass, tempered glass, stainless steel, or glass-lined steel or other material selected, for instance, according to its suitability taking into account factors such as, for example, whether the material is nonreactive with a particular reaction mixture, capable of excluding potential initiator deactivating materials (e.g., atmospheric $O_2$ and $H_2O$) from the reaction chamber, capable of transferring heat, or capable of withstanding elevated or reduced pressure. Particularly suited materials include 316 L stainless steel and low coefficient of expansion-type glass (e.g., PYREX glass, available from Corning Glass Works, Corning, N.Y. ).

The cylinders 110 may be joined by flanges 108. Additionally, various types of gaskets (not shown in FIG. 1) may be used to join cylinders 110, in conjunction with or in the alternative to flanges 108. Stirred tube reactor 100 has inlet port 102 and extraction port 114.

While inlet port 102 and extraction port 114 are conveniently located on flanges 108 in the embodiment exemplified in FIG. 1, other embodiments are contemplated, so long as the inlet port and extraction port are in fluid communication with the reaction chamber.

Stirred tube reactor 100 may be oriented horizontally or angled. Particularly, stirred tube reactor 100 may be angled generally upward (i.e., against gravity) from its input end to its output end so as to ensure that any gas in the stirred tubular reactor may escape.

Figure 2:
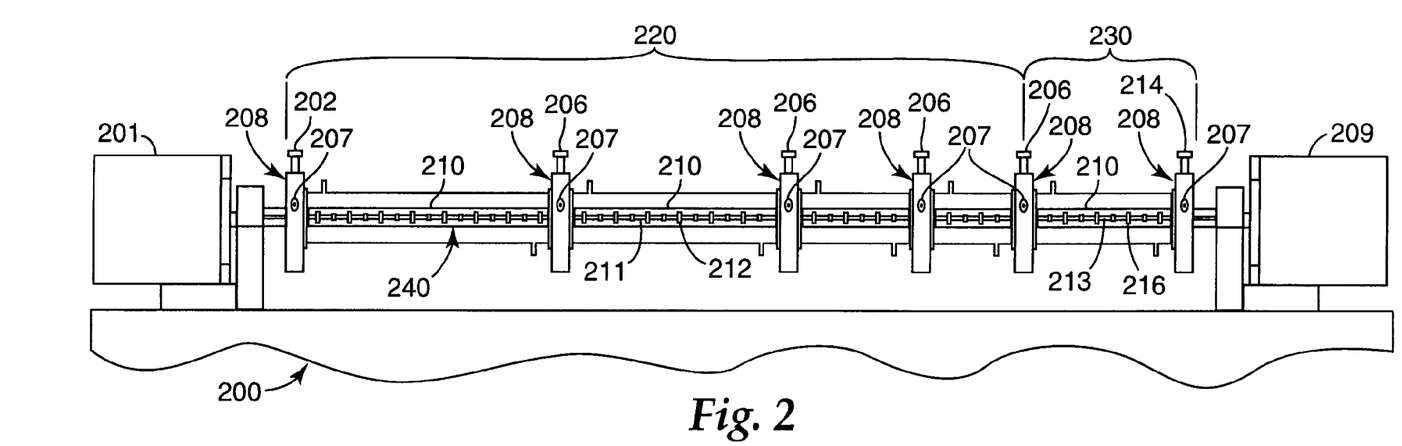
FIG. 2 is a side view of second exemplary embodiment of the present invention.

In another embodiment, shown in FIG. 2, reactor 200 comprises cylinders 210 of different lengths. The use of different length cylinders may allow for the preparation of block copolymers comprising blocks of varying length. Initial reaction mixture is added via inlet port 202. Additional monomer or other reactive species may be added through flange inlet ports 206 in flange 208 that is also equipped with analytical port 207. Where a plug of the reaction mixture flows through the reaction chamber at a fixed rate, the reaction time is varied by varying the length of cylinders 210. Reaction product may be obtained through extraction port 214.

The design of reaction chamber 240 can be varied without departing from the present invention. Such design variations include, for example, the length of the cylinders, the shape of the reaction chamber, and the volume of the reaction chamber. Optimization of such variables for a given polymerization system is contemplated by the present invention.

FIG. 2 also illustrates first shaft 211 that extends the entire length of first stirring section 220 and second shaft 213 that extends the entire length of second stirring section 230. First shaft 211 rotationally engages first driving mechanism 201 and second shaft 213 rotationally engages second driving mechanism 209. First shaft 211 has a plurality of paddles 212 extending therefrom and second shaft 213 has a plurality of paddles 216 extending therefrom.

Figure 4:
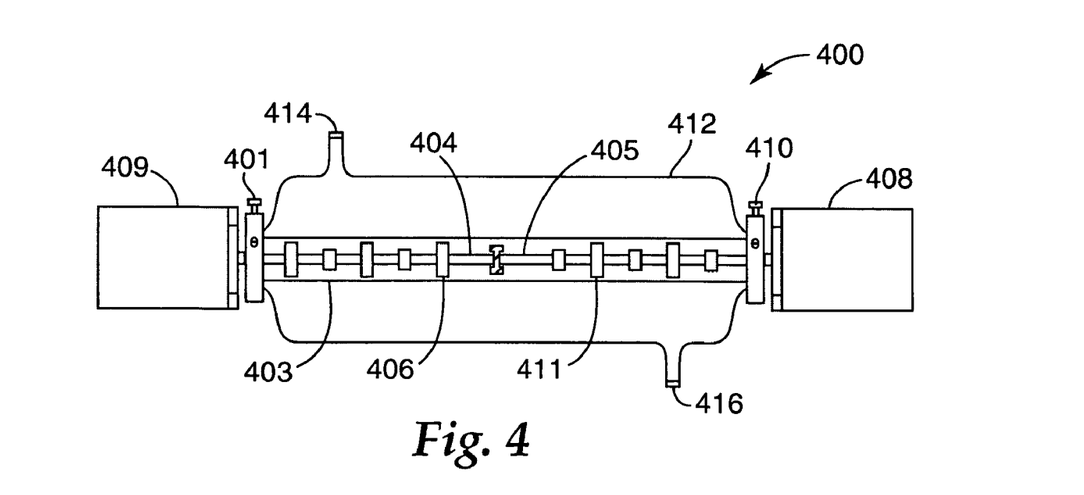
FIG. 4 is a side view of a third exemplary embodiment of the present invention.

In another exemplary embodiment, shown in FIG. 4, stirred tube reactor 400 has reaction chamber 403. Reaction chamber 403 is a single cylinder reaction chamber. Reaction chamber 403 has inlet port 401 and extraction port 410. First shaft 404 extends into reaction chamber 403. First shaft 404 has at least one first-shaft paddle 406 extending therefrom. Second shaft 405 extends into reaction chamber 403. Second shaft 405 has at least one second-shaft paddle 411 extending therefrom. First driving mechanism 409 rotationally engages the first shaft 404 and second driving mechanism 408 rotationally engages second shaft 405. First and second shaft 404, 405 are capable of rotating at different relative rates and/or in different directions.

FIG. 4 also illustrates jacketed (shell-in-tube) stirred tube reactor 400. Reaction chamber 403 is surrounded by temperature jacketing 412. Heat transfer fluid, such as, for instance, water or ethylene glycol, can be circulated through temperature jacketing 412 via inlet 414 and outlet 416. This allows for control of the reaction temperature.

As used herein, "reaction chamber" means a continuous passage, regardless of its method of formation. For example, the reaction chamber may be drilled from stainless steel, may be provided by blown glass, or may be formed by a molded polymer. The reaction chamber may be bent, that is, the inner wall portion of a length-wise cross section of the bore may be non-linear. In the illustrated embodiments, the reaction chamber is not bent, that is, the inner wall portion of a length-wise cross section of the reaction chamber is linear (i.e., the reaction chamber is substantially tubular).

Shafts may independently comprise a variety of materials including, for example, inert metals, e.g., stainless steel. Those skilled in the art are capable of matching materials to be compatible with the corresponding reaction mixture. For example, where a corrosive initiator such as alkyllithium is used in the stirred tubular reactor, the shaft may comprise a corrosion resistant stainless steel, e.g., 316 L stainless steel. In the context of the present invention, it is also understood that at least a portion of the reaction chamber (and the corresponding housing), may comprise any material that is either opaque to or transparent to actinic radiation (e.g., visible and/or ultraviolet electromagnetic radiation). Thus, a reaction mixture may be exposed to (or shielded from) certain electromagnetic radiation, particularly actinic radiation, such as, for example, ultraviolet radiation, visible light, or a combination of the two. The phrase "transparent to actinic radiation" means that at least a portion of actinic radiation, from whatever source external to the reaction chamber, can reach the reaction mixture.

Referring to FIG. 3, coupler 307 is located inside reaction chamber 303 and has first end 307a that engages first shaft 304 and second end 307b that engages second shaft 305. Coupler 307 can provide structural stability to first and second shafts 304, 305 within reaction chamber 303. Shafts 304 and 305 may rotate independent of coupler 307 or may rotate with coupler 307 wherein first and second ends 307a, 307b of coupler 307 are capable of rotating independently. Coupler 307 may comprise any appropriate material considering the physical (for example, temperature and torque) and chemical (for example, reactants, solvents and initiators) environment to which it is subjected. Suitable materials include, for example, polymeric materials (e.g., fluoropolymers) and metals (e.g., stainless steel).

The shafts extend substantially parallel to the sides of the stirred tube reactor. While it is contemplated in this invention that the stirred tube reactor may be bent, the reactor may also be substantially cylindrical.

While the particular embodiments exemplified herein have two shafts, it will be readily understood that the invention is susceptible to having more than two shafts. Such additional shafts may, for instance, be parallel or substantially parallel to the first and second shafts; may be capable of rotating independently of the first and second shafts; and may be disposed collinear or substantially collinear with the first and second shafts.

In order to accomplish differential stirring, a reactor may be equipped with a first and second shaft rotationally engaged with a first and second driving mechanism, respectively. The first and second driving mechanisms may include, for example, motors or gear boxes. The exact nature of the driving mechanism is not critical to the invention so long as the driving mechanism can impart rotational movement to the shafts. If the first and second driving mechanisms are motors, variable speed motors may be particularly suited.

To assist in maintaining essentially plug flow through a stirred tubular reactor, the mixing members may be designed so as to minimize reaction mixture build-up on the mixing members, shafts, and/or on the inside of the reaction chamber. The mixing members may also be designed to provide any other desired flow or reaction condition characteristic. These design options are well known in their own relevant art, for instance, U.S. Pat. No. 3,630,688 (Takiguchi et al.) or U.S. Pat. No. 5,145,255 (Shimada et al.).

In one embodiment, the shafts extend into a cylindrical reaction chamber. The shafts are typically located at or near the center of the reaction chamber (that is, at the center of any cross-sectional circle taken perpendicular to the flow of reactants) and are substantially parallel to the inner walls of the reaction chamber.

In use, the mixing members stir the reaction mixture and assist in heat transfer. In addition, the mixing members may be designed such that they assist in impelling the reaction mixture through the tube.

Optional designs for the mixing members include paddles of various shapes, for instance, rectangular, spade, oval, or kite and may include, for instance, holes or profiled edges. Other mixing member designs include screw-type. The mixing members may comprise any appropriate material, taking into consideration, for example, the flow properties provided, chemical or heat resistance required, sheer applied and compatibility with the shaft material. Examples of useful materials include stainless steel, fluorinated polymers, particularly fluorinated rubber, etc.

The stirred tube reactor of the present invention comprises an inlet port and an extraction port.

In use, a reaction mixture may be introduced into the reaction chamber via an inlet port in fluid communication with the reaction chamber (for example, inlet port 102 in FIG. 1). Any product formed as well as unreacted species, solvent, or any other component in the reaction chamber may be obtained from the reactor through an extraction port (for example, extraction port 114 in FIG. 1).

Optionally, any or all of the flanges may be further equipped with a flange inlet port (such as, for example, 106 in FIG. 1) that is in fluid communication with reaction chamber. A flange inlet port may provide an opportunity to add components to the reaction mixture, such as, for example, initiator, monomer, solvent, or a combination thereof.

The flange may also have an analytical port (such as, for example, 107 in FIG. 1). The optional analytical port may allow removal of an aliquot of reaction mixture for subsequent analysis, other types of monitoring (including in-situ monitoring) of the reaction mixture at various points in reaction chamber, or both. One may monitor for such properties as, for example, reaction temperature measured by a thermocouple. In one embodiment, the flange inlet port may be designed as to allow for substantial radial mixing as described in pending U.S. patent application Ser. No. 10/606,916 (Marx et al.) filed Jun. 26, 2003, the disclosure of which is incorporated herein by reference.

The particular rate and direction of stirring may be optimized for a given set of reaction conditions including temperature, solvent, monomer, polymer architecture, solids content and viscosity. Furthermore, the rate of stirring may be optimized to provide optimum processing results. These processing results may include, for example, minimizing reactor fouling, lowering the polydispersity index, or a combination of the two.

As used herein, the rate of stirring is measured in revolutions per minute or "rpm" of a shaft. The direction of stirring is a relative term that refers to whether the shafts are stirred clockwise or counterclockwise with respect to a consistent line if sight from a common reference point. For instance, where one shaft is stirred at 100 rpm clockwise and another shaft is stirred at 100 rpm counterclockwise, they are stirred in different directions, even though they are stirred at the same absolute value of rate. The difference in stir rate between these two shafts would be 200 rpm. Similarly, where one shaft is stirred at 100 rpm clockwise and another shaft is stirred at 225 rpm clockwise, they are stirred at different rates, even though they have the same direction of stirring. The difference in stir rate between these two shafts would be 125 rpm.

In some embodiments, the present invention relates to methods of preparing polymeric materials using an apparatus according to the present invention. Particularly, the present invention relates to a method that includes polymerizing a reaction mixture that comprises a polymerizable monomer, an initiator system, and optionally a solvent. The monomer and initiator system may give rise to a living polymerization.

The term "living polymerization" refers to a chain polymerization that proceeds via a mechanism without chain termination or chain transfer. In an ideal living polymerization, the polymer molecule maintains a living end (i.e., reactive site) as it traverses the reaction chamber. Living polymerization may take place by any mechanism known in the art, including, for example, cationic, anionic, and free radical polymerization. Typically, the initiator system may generate reactive species in the presence of the monomer (e.g., anions in the presence of anionically polymerizable monomers). The solvent system may facilitate the mobility of the monomers, initiator system, and the polymer produced as well as serving as a partial heat sink.

Examples of anionically polymerizable monomers include, for instance, vinyl aromatics (including styrenics), dienes, vinylpyridines, alkyl methacrylates, epoxides (e.g., ethylene oxide and propylene oxide), oxiranes, cyclic sulfides (e.g., thiiranes), lactones, lactides, cyclic carbonates, lactams, cyclosiloxanes (e.g., hexamethyltrisiloxane), acrylonitrile, and n-metallocenophanes as well as anionically-polymerizable polar monomers. Suitable vinyl aromatic monomers include styrene, α-methylstyrene, 4-methylstyrene, 3-methylstyrene, 4-ethylstyrene, 3,4-dimethylstyrene, 2,6-dichlorostyrene, vinyl naphthalene, and vinyl anthracene. Polymerizable dienes include, for example, isoprene, isoprene-derivatives, butadiene, and 1,3-pentadiene. Anionically polymerizable polar monomers include, for example, vinylpyridine, vinylpyridine derivatives including 2-vinylpyridine, and 4-vinylpyridine, t-butyl acrylate and methacrylic monomers such as tert-butyl methacrylate, methyl methacrylate, isodecyl methacrylate, allyl methacrylate, and glycidyl methacrylate.

Vinylpyridine materials that may be produced by the present invention are typically synthesized by well-known synthetic methods. For instance, see Luxton et al., *Polymer* 1978, 19, 1320 and Klein, J. W.; Lamps, J.-P.; Gnanous, Y.; Rempp, P. *Polymer* 1991, 32, 2278.

Useful anionically polymerizable monomers include those, for example, that have multiple reaction sites. For example, some monomers may have at least two anionically-polymerizable sites. This type of monomer can produce branched polymers. The amount of this type of monomer added is not critical to the present invention. In some applications, such monomers may comprise less than 10 mole percent of a given reaction mixture because higher amounts tend to lead to a high degree of crosslinking in addition to branching.

Anionically polymerizable monomers may include at least one functionality that is not anionically polymerizable. Such functionalities may include, for example, those that are reactive by condensation, free radical coupling, photolytic coupling, and hydrosilylation.

The temperature of polymerization may be controlled, for example, with a temperature control system as described in U.S. Pat. No. 6,448,353 (Nelson et al.), incorporated herein by reference. Temperature control may be advantageous, for example, when temperature sensitive monomers are used.

Typically, initiator systems should be chosen from those particularly useful with specific monomers or mixtures of monomers. For instance, a number of initiator systems are compatible with the exemplary anionically polymerizable monomer systems discussed herein. Some of these are summarized in Hsieh et al., *Anionic Polymerization: Principles and Practical Applications*, Ch. 5, and 23 (Marcel Dekker, New York, 1996). For example, for vinylpyridine, particularly suited initiators include n-butyllithium, sec-butyllithium, naphthyllithium, phenyllithium, and p-tolyllithium.

The anionic polymerization of methacrylates may often be accompanied by side reactions such as chain transfer, back-biting, and termination. These phenomena may be suppressed by lowering the reaction temperature or by selective synthetic modification of growing polymer chain ends with 1,1'-diphenylethylene to introduce more efficient methacrylate initiation.

In a living polymerization, the ratio of initiator to monomer typically determines the average molecular weight of the resulting polymer. Subsequent monomers may be added without additional initiators, e.g., when a block copolymer is being made.

Block copolymers are polymers having at least two compositionally discrete segments. A non-exhaustive list of block copolymers includes di-block copolymers, tri-block copolymers, random block copolymers, and star-branched copolymers. For example, AB is a di-block copolymer comprised of an A block and a B block that are compositionally different. ABA is a tri-block copolymer in which the A blocks are compositionally the same, but different from the B block. ABC is a tri-block copolymer comprised of A, B, and C blocks, each block being compositionally different.

When employed, solvents are typically chosen so as to be compatible with specific monomers during polymerization. One or more solvents may be used in a reaction solvent system. The amount of solvent is not critical to the present invention. In an exemplary situation, sufficient solvent is added to solubilize the reaction components (including additional monomer added downstream) and the resulting product.

The concentration of monomers in the solvent can vary, for example, depending on the reaction system. Thus, some systems may have a monomer concentration of at least 10 percent by weight, based on the total weight of the reaction mixture. Other systems may contain monomers in an amount of less than 80 percent, less than 60 percent, or even less than 50 percent by weight, based on the total weight of the reaction mixture. When polar monomers are used, appropriate solvents include, for example, benzene, ethyl benzene, cyclohexane, toluene, tetrahydrofuran and xylene. Co-solvents such as dialkyl ethers (e.g., diethyl ether, dibutyl ether), tetrahydrofuran, or tetramethylene diamine may also be used for both polar and non-polar monomer systems.

Homopolymers, random copolymers, block copolymers, star branched or hyperbranched homo-, random, and block copolymers, and end-functionalized polymers can be made according to the present invention.

End-functionalized materials may be synthesized by adding reagents containing reactive groups, such as reactive halogen or unsaturated groups, capable of quenching a "living" polymerization as described above. For example, anionic polymerizations are not readily amenable to the polymerization of monomers containing relatively acidic, proton donating groups such as amino, hydroxyl, thiol, carboxyl or acetylene functional groups. These groups may be included, once incorporated in functional quenching agents, if protected by the use of suitable protecting groups that are stable to the conditions of anionic polymerization and may be readily removed by post polymerization treatments. Suitable quenching agents include, for example, oxygen, water, hydrogen, steam, alcohols, ketones, esters, amines, and hindered phenols. Suitable functional quenching agents may include, e.g., chlorosilanes ($ClSi(CH_3)_2N(CH_3)_2$, $ClSi(CH_3)_2OR$, $ClSi(CH_3)_2H$), 1,3-bis(trimethylsilyl)carbodiimide, and 1-(3-bromopropyl)-2,2,5,5-tetramethyl-1-aza-2,5-disilacyclopentane.

Quenching agents with multiple reactive sites may be used to couple two living polymer chains thereby increasing the average molecular weight. Suitable multifunctional or multisite quenching agents particularly useful in anionic polymerization include, for instance, dimethyl phthalate, phosphorous trichloride, methyltrichlorosilane, silicon tetrachloride, hexachlorodisilane, 1,2,3-tris(chloromethyl)benzene, dichlorodimethylsilane, dibromo-p-xylene, dichloro-p-xylene, bis(chloromethyl)ether, methylene iodide, 1,4-dibromo-2-butene, 1,4-diiodo-2-butene, and 1,2-dibromoethane.

In addition to the basic reaction mixture components, other compounds that may modify the properties of the polymer product may be introduced into the reaction. For instance, one or more preformed polymers, inert tackifiers, pigments, and fillers may be added to the reaction mixture. Polymer adhesive properties (e.g., peel and shear) or modulus characteristics may be modified by addition of tackifiers and clay/silica respectively.

Optionally, one or more components of the reaction mixture may be purified prior to introduction into the stirred tube reactor. Such purification and delivery may be accomplished according to the method described in U.S. Pat. No. 6,448,353 (Nelson et al.).

Advantageously, stirred tube reactors are typically not prone to build-up (or at least have reduced rates of build up as compared to prior stirred tube reactor designs) that often occurs in stagnant regions of the reaction chamber or on the downstream surfaces of paddles. Such undesirable build up may result in reduced heat transfer and/or plugging and/or fouling of the reactor.

The viscosity in the stirred tube reactor may increase many orders of magnitude along the reaction path, for instance, from 1 millipascal second (1 cp) at the beginning of the reactor to 10,000,000 millipascal second (10,000,000 cp) by the end. As the viscosity of the reaction mixture increases, stirring may become more difficult and concomitant problems with reactor fouling, described above, may arise. Increasing the stirring rate of the paddles and shaft may decrease reactor fouling and improve heat transfer. Increasing the stirring rate, however, can have serious detrimental effects in a less viscous region. Under high stirring rates, a less viscous region may display characteristics of a continuous stirred tank reactor, where there is significant backmixing and poor plug flow characteristics (that is, a significant amount of axial mixing may occur). When this backmixing occurs and plug flow characteristics are compromised, the polydispersity of the product polymer is often increased. By polydispersity is meant the weight average molecular weight divided by the number average molecular weight. Polydispersity is reported on a polydispersity index. For an ideal plug flow, the polydispersity index is 1.0. However, as understood herein, some deviation from the ideal polydispersity index is tolerated in reactors that are still known as plug flow reactors, including stirred tube reactors. Thus, this invention also recognizes that a need exists in the art for reactors and methods for minimizing the polydispersity (that is, attaining a value for the polydispersity index close to 1 of product polymers produced in plug flow reactors).

Lowering the polydispersity may improve the polymer product by producing chains of uniform length, a feature that may be especially crucial with block copolymers as they self-assemble into three-dimensional, nanoscale morphologies. The relative block sizes determine what morphology is created, thus it may be essential that all blocks are the same length in order to obtain a uniform morphology. A narrow polydispersity may also be vital in controlling the order/disorder transition of the block copolymer system.

Although the present invention is herein described in terms of specific embodiments, it will be readily apparent to those skilled in this art that various modifications, rearrangements, and substitutions may be made without departing from the spirit of the invention. The scope of the present invention is thus only limited by the claims appended hereto.

Test Methods

Molecular Weight and Polydispersity

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter. Then about 150 microliters ($\mu$L) of the filtered solution was injected into a chromatographic column (e.g., PLGEL-MIXED B COLUMN, available from Polymer Laboratories, Amherst, Mass.) that was part of a GPC system also having an autosampler (e.g., WATERS 717 AUTOSAMPLER, available from Waters Corporation, Milford, Mass.). The system was operated at room temperature with a THF eluent that moved at a flow rate of approximately 0.95 mL/min. A refractive index detector (e.g., ERMA ERC-7525A REFRACTIVE INDEX DETECTOR, available from JM Science Inc. Grand Island, N.Y.) was used to detect changes in concentration. Number average molecular weight ($M_n$) and polydispersity index (PDI) calculations were based on a calibration mode that used narrow polydispersity polystyrene controls ranging in molecular weight from $6\times10^6$ to $600\times10^6$. The actual calculations were made with processing software (e.g., PL CALIBER software available from Polymer Laboratories, Amherst, Mass.).

Block Concentration

The concentration of the different blocks in a block copolymer was determined by Nuclear Magnetic Resonance (NMR) spectroscopy analysis. A sample was dissolved in deuterated chloroform to a concentration of about 10 weight percent and placed in a 500 MHz $^1$H-NMR spectrometer (e.g., UNITY 500 MHz $^1$H-NMR SPECTROMETER, available from Varian Inc., Palo Alto, Calif.). Block concentrations were calculated from relative areas of characteristic block component spectra.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

EXAMPLES

TABLE 1

| Material | Description |
| --- | --- |
| Isoprene | Available from Aldrich Chemical Co., Milwaukee, WI |
| t-Butyl methacrylate | Available from Sans Esters Corp., New York, NY |
| 1,1'-Diphenylethylene | Available from Acros/Fisher Scientific, Itasca, IL |
| Sec-Butyllithium | Available from Aldrich Chemical Co., Milwaukee, WI 1.4 Molar in cyclohexane |
| 4-Vinylpyridine | Available from Reilly Industries, Indianapolis, IN |
| Toluene | Available from Worum Chemical, St. Paul, MN |
| Tetrahydrofuran (THF) | Available from ISP Technologies, Wayne, NY |
| Cyclohexane | Available from Ashland Chemical, Columbus, OH |

Monomer Preparation and Handling

The reactant monomers (isoprene, t-butyl methacrylate, 1,1'-diphenylethylene, and 4-vinylpyridine) were nitrogen sparged until the $O_2$ concentration was less than 1 part per million (ppm). Deoxygenated monomer was pumped through a column (l=91.4 cm, d=2.5 cm) of basic alumina ($Al_2O_3$, activated, acidic, Brockmann I, about 150 mesh, Sigma-Aldrich Fine Chemicals, Milwaukee, Wis.). t-Butyl methacrylate and 1,1'-diphenylethylene solutions were additionally pumped through molecular sieve beads (available as ZEOLITE 3A from UOP LLC, Des Plaines, Ill.). The purified monomers were then fed to the stirred tube reactor (STR) described below. Reaction solvents were pumped through molecular sieve beads and fed directly to the STR. The THF also was deoxygenated by nitrogen sparging for 30 minutes and purified by pumping through both 3A molecular sieve beads and a column of alumina. The THF stream was then fed to the STR in the same zone as the isoprene. Sec-butyllithium initiator (1.4 M sec-butyllithium in cyclohexane) was diluted by addition of pre-purified cyclohexane and was added to the first zone of the STR without further purification.

Reactor Descriptions

10 L Glass STR

This stirred tube reactor (STR) had a capacity of 10 liters and consisted of five jacketed (shell-in-tube) glass sections (Pyrex cylinders). Each tube section had an outside diameter of 7.62 cm, an inside diameter of 6.99 cm, and a length of 57.2 cm. The jackets had an outside diameter of 11.63 cm, an inside diameter of 10.99 cm, and a length of 52.1 cm. The tube sections were joined together with stainless steel coupling flanges, each 3.18 cm thick. The coupling flanges were equipped with individual temperature sensing thermocouples extending into the interior of the tube sections. These thermocouples permitted the temperature of the reaction mixture in each section to be monitored and adjusted up or down (as necessary) to a set point by varying the temperature of the heat transfer fluid flowing through the jacketed sections. The coupling flanges also contained various inlet ports through which materials could be added into the reaction mixture. The STR was closed off at both ends with stainless steel flanges.

Extending through the center of the joined cylinders was a 1.27 cm diameter stainless steel shaft suspended along the center of the cylinder axis by three shaft alignment pins extending from each of the coupling flanges. The shaft was split into two sections, one section for the first four zones and the other section for the fifth zone. The second section of the shaft butted into a polytetrafluoroethylene (PTFE) plug in the first section of the shaft. This allowed the two sections of the shaft to be stirred at two different rates and two different directions in the same reactor. Thirty-eight detachable stainless steel paddles with approximately 4.5 cm between each paddle were attached to the shaft. The rectangular paddles in the first four zones were 0.24 cm thick, 4.5 cm wide, and 5.1 cm long. The rectangular paddles in the fifth zone were 0.24 cm thick, 5.1 cm wide, and 5.7 cm long. The paddle configuration was as follows: 7 in Zone 1, 8 in Zone 2, 8 in Zone 3, 8 in Zone 4, and 7 in Zone 5. The shaft used to drive Zones 1–4 was attached to a 2.2 kW variable speed motor. The shaft for Zone 5 was attached to a 0.25 HP Baldor variable speed motor.

0.94 L Glass STR

This STR had a reaction zone capacity of 0.94 liters and consisted of five jacketed (shell-in-tube) glass sections (Pyrex cylinders). The tube had an inner diameter of 3.01 cm and an outer diameter of 3.81 cm. The shell had a diameter of 6.4 cm. All five sections, corresponding to zones 1–5, were 25.4 cm long. The sections were joined together by stainless steel coupling flanges. The coupling flanges were equipped with individual temperature sensing thermocouples extending into the interior of the cylindrical sections. These thermocouples permitted the temperature of the reaction mixture in each section to be monitored and adjusted up or down (as necessary) to a set point by varying the temperature of the heat transfer fluid flowing through the jacketed sections. The coupling flanges also contained various single inlet ports through which monomer or solvent could be added into the reaction mixture. The coupling flange located between the fourth and fifth zones was designed in such a way that the monomer would enter the flange, fill a circumferential chamber inside the flange, and then enter the reactor through 12 points equally spaced around the center of the reactor or through a single point as in the other coupling flanges.

Extending through the center of the joined cylinders was a stainless steel shaft with a length 154.9 cm and a diameter of 0.95 cm. The shaft was suspended along the cylinder axis by shaft alignment pins. The shaft was split into two sections, one section for the first four zones and the other section for the fifth zone. The second section of the shaft butted into a PTFE plug in the first section of the shaft. This allowed the two sections of the shaft to be stirred at two different rates and two different directions in the same reactor. Thirty detachable stainless steel paddles with approximately 2.1 cm between each paddle were affixed to the shaft. The rectangular paddles were 1.6 mm thick, 1.91 cm wide, and 2.54 cm long. Each section contained six paddles. Each end of the shaft was attached to a variable speed, 0.25 hp Baldor industrial gear motor. The stir rate from either end could be controlled from 1 rpm to 314 rpm.

Heat transfer was accomplished by attaching recirculators to the jackets. All zones were heated or cooled with water and were all independently heated or cooled except zones 2 and 3, which were heated/cooled in series from the same recirculator. Zone 1 was heated/cooled in a co-current manner while the other four zones were heated/cooled in a countercurrent fashion.

Temperatures in the reactor were monitored and recorded through use of a thermocouple temperature recorder (e.g., OCTTEMP 8-CHANNEL RECORDER, available from Omega Engineering, Inc. Stamford, Conn.) and accompanying software interfaced with a personal computer. Thermocouples (type J) were positioned in each of the stainless steel coupling pieces to provide zone batch temperatures during polymerizations.

Example 1

An initiator slurry was prepared by mixing 100 g of 1.4 M sec-butyllithium in cyclohexane with 3000 g of oxygen-free cyclohexane and stirred at room temperature for about 30 minutes. Purified isoprene monomer (8.2 g/min), purified cyclohexane solvent (6.6 g/min), purified THF solvent (0.5 g/min), and the initiator solution (7.0 g/min) were fed into the first zone of the 0.94-L STR via a reciprocating piston pump. A color change from clear to yellow was observed in zone 1 when the initiator solution contacted the monomer in the presence of THF, and an exotherm resulted. The reaction temperature was kept at about 60° C. by adjusting the jacket temperature of zone 1 to 55° C. The temperature of the reaction mixture in each of the 5 zones of the STR was individually maintained at: Z1=60° C., Z2= 60° C., Z3=45° C., Z4=40° C., and Z5=30° C.

The materials flowed through the first three zones, facilitated by stirring paddles along the reaction path. Polymerization of the polyisoprene continued to essentially 100% completion by the end of zone 3, thereby forming a "living" polyisoprene polymer solution. At the start of zone 4, purified 1,1'-diphenylethylene (DPE) solution (2.5 wt % in cyclohexane) (3.2 g/min) was fed via a reciprocating piston pump to the "living" polyisoprene reactive mixture, resulting in a color change, from yellow to a red, indicating that a reaction had occurred with the DPE and the "living" polyisoprene polymer. At the beginning of zone 5, purified t-butyl methacrylate (tBMA) (3.3 g/min) was fed via a reciprocating piston pump to the "living" polymer solution, resulting in a color change from deep red to white indicative of "living" poly-tBMA polymer. The stir rate of each stir shaft was varied at either 100 or 225 rpm, the stir direction of each stir shaft was varied, and the method of entry of the tBMA was varied. The resulting poly(isoprene-block-t-butyl methacrylate) block copolymer was quenched with deoxygenated methanol and samples were collected from the extraction port and analyzed. In addition, a polyisoprene homopolymer sample was taken at an analytical port before the addition of DPE or tBMA as a baseline for PDI. The total residence time for this reaction was about 29 minutes.

Each sample was tested for number average molecular weight (Mn) and polydispersity index (PDI). Results and stir conditions are shown in Table 2 (below).

TABLE 2

| Sample | Stir Rate Z1–Z4 (rpm) | Stir Rate Z5 (rpm) | Stir Direction Z1–Z4 | Stir Direction Z5 | Entry points Z5 | Mn g/mol × $10^4$ | Mw g/mol × $10^4$ | PDI |
|---|---|---|---|---|---|---|---|---|
| Polyisoprene | 100 | 100 | CW | CW | — | 2.56 | 3.14 | 1.229 |
| 1A | 100 | 100 | CW | CW | 12 | 4.04 | 7.95 | 1.967 |
| 1B | 100 | 100 | CW | CCW | 1 | 4.39 | 6.19 | 1.409 |
| 1C | 100 | 225 | CW | CCW | 1 | 4.69 | 6.08 | 1.296 |
| 1D | 100 | 225 | CW | CCW | 12 | 5.25 | 6.78 | 1.291 |
| 1E | 100 | 225 | CW | CW | 12 | 4.66 | 6.80 | 1.460 |
| 1F | 225 | 225 | CW | CW | 12 | 5.26 | 12.0 | 2.284 |

In Table 2, CW = clockwise stirring and CCW = counter-clockwise stirring

Example 2

An initiator slurry was prepared by mixing 1000 g of 1.4 M sec-butyllithium in cyclohexane with 5400 g of oxygen-free cyclohexane and stirred at room temperature for about 30 minutes. Purified isoprene monomer (165.0 g/min), purified toluene solvent (290.0 g/min), purified THF (2.0 g/min), and the initiator slurry (30.3 g/min) were fed via a reciprocating piston pump into the 10-L STR at the beginning of the first zone. A color change from clear to yellow was observed in zone 1 when the initiator solution contacted the isoprene in the presence of THF.

The materials flowed through the first four zones, facilitated by stirring paddles along the reaction path. Polymerization continued to essentially 100% completion by the end of zone 4, thereby forming a "living" polyisoprene (PI) solution. Purified 4-vinylpyridine monomer was fed into the reactor (6.0 g/min) at the beginning of zone 5. A color change from yellow to red resulted. The jacket temperatures were maintained at: Z1=92° C., Z2=92° C., Z3=55° C., Z4=27° C., Z5=33° C. The stir rate of Zones 1 through 4 was set at 200 rpm. The stir rate for Zone 5, at the point where 4-vinylpyridine was being added, was about 400 rpm in the opposite direction. The temperature and reaction conditions for the 4-vinylpyridine addition were such that the block copolymer tended to gel and become insoluble. When this occurred, the polymer precipitate tended to adhere to the reactor and the paddles, causing significant fouling eventually leading to process shutdown. In this example, the polymer precipitated out of solution, but the rapid stirring in Zone 5 prevented the precipitates from fouling the reactor and allowed the gels to flow out of the reactor.

The resulting poly(isoprene-block-4-vinylpyridine) (PI-PVP) block copolymer was quenched with deoxygenated methanol and analyzed for number average molecular weight (Mn), polydispersity index (PDI) and relative concentrations of polyisoprene (PI) to poly(4-vinylpyridine) (PVP). The total residence time for this reaction was about 16 minutes and the reaction was carried out at 35% solids. The resulting analysis is shown in Table 3 (below).

TABLE 3

| Sample | $M_n$ g/mol × $10^4$ | $M_w$ g/mol × $10^4$ | PDI | 1.2 PI mol % | 1.4 PI mol % | 3.4 PI mol % | PVP mol % |
|---|---|---|---|---|---|---|---|
| 2 | 2.39 | 4.71 | 1.97 | 1.0 | 67.3 | 30.3 | 1.4 |

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof.

We claim:

1. A stirred tube reactor comprising:
   a reaction chamber;
   a feed port in fluid communication with the chamber;
   an extraction port in fluid communication with the chamber;
   a first shaft having first and second ends, wherein the first end of the shaft extends into the chamber and the first shaft has at least one mixing member extending therefrom;
   a second shaft having first and second ends, wherein the first end of the second shaft extends into the chamber, and the second shaft is substantially collinear with the first shaft, and the second shaft has at least one mixing member extending therefrom;
   a first driving mechanism that rotationally engages the first shaft;
   a second driving mechanism that rotationally engages the second shaft.

2. A stirred tube reactor according to claim 1, wherein the first and second shafts rotate at different rates.

3. A stirred tube reactor according to claim 1, wherein the first and second shafts rotate in different directions.

4. A stirred tube reactor according to claim 1, wherein the first and second shafts rotate at different rates and in different directions.

5. A stirred tube reactor according to claim 1, wherein the reaction chamber is cylindrical and the first and second shafts are axially disposed substantially in the center of the reaction chamber.

6. A stirred tube reactor according to claim 1, further comprising a coupler located inside the reaction chamber and having a first end that engages the first end of the first shaft and a second end that engages the first end of the second shaft.

7. A stirred tube reactor according to claim 6, wherein the first and second shafts rotate at different rates.

8. A stirred tube reactor according to claim 6, wherein the first end of the coupler rotates with the first shaft and the second end of the coupler rotates with the second shaft.

9. A stirred tube reactor according to claim 1, wherein at least one of the mixing members is a paddle.

10. A stirred tube reactor according to claim 1, wherein at least one of the mixing members is made of stainless steel.

11. A stirred tube reactor according to claim 1, wherein at least one of the driving mechanisms comprises a motor.

12. A stirred tube reactor according to claim 1, wherein the reaction chamber comprises a first and second tubular section, further comprising a flange that mechanically engages the first and second tubular sections.

13. A stirred tube reactor according to claim 12, wherein the flange includes a thermocouple.

14. A stirred tube reactor according to claim 1, wherein the reaction chamber has at least one temperature controlled region.

15. A stirred tube reactor according to claim 1, wherein the reaction chamber comprises a material that is transparent to actinic radiation.

* * * * *

UNITED STATES PATENT AND TRADEMARK OFFICE
CERTIFICATE OF CORRECTION

PATENT NO. : 6,969,491 B1
DATED : November 29, 2005
INVENTOR(S) : Marx, Ryan E.

It is certified that error appears in the above-identified patent and that said Letters Patent is hereby corrected as shown below:

Title page,
Item [56], References Cited, OTHER PUBLICATIONS,
"Marx et al.," reference, delete "Jun. 16, 2003." and insert -- Jun. 26, 2003. --.

Column 13,
Line 61, delete "1.2 Pl" and insert -- 1, 2 Pl --.
Line 61, delete "1.4 Pl" and insert -- 1, 4 Pl --.
Line 61, delete "3.4 Pl" and insert -- 3, 4 Pl --.

Signed and Sealed this

Fourteenth Day of February, 2006

JON W. DUDAS
*Director of the United States Patent and Trademark Office*